5 Sheets—Sheet 5.
P. B. TYLER.
HYDRAULIC COTTON PRESS.
No. 176,385. Patented April 18, 1876.
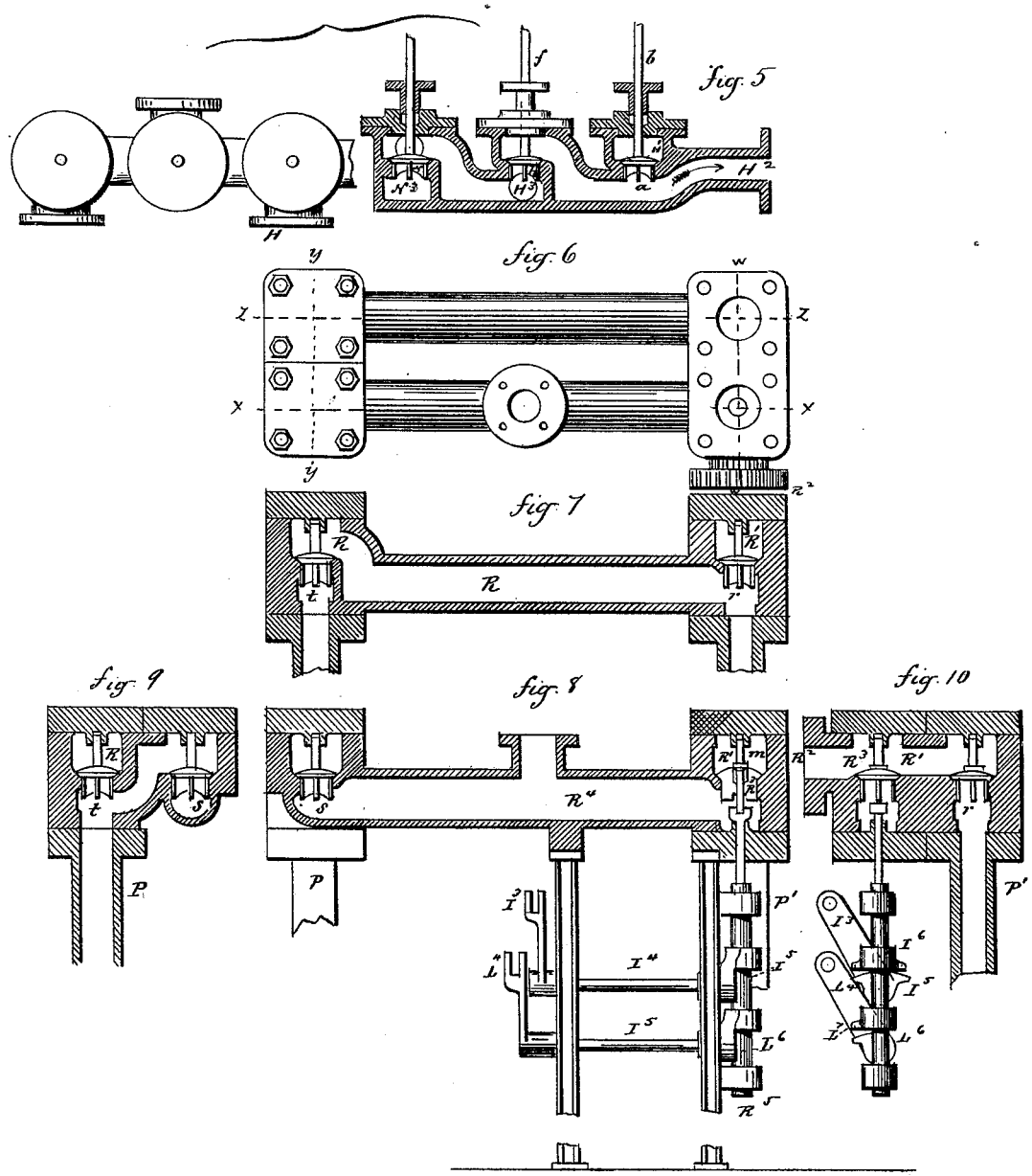

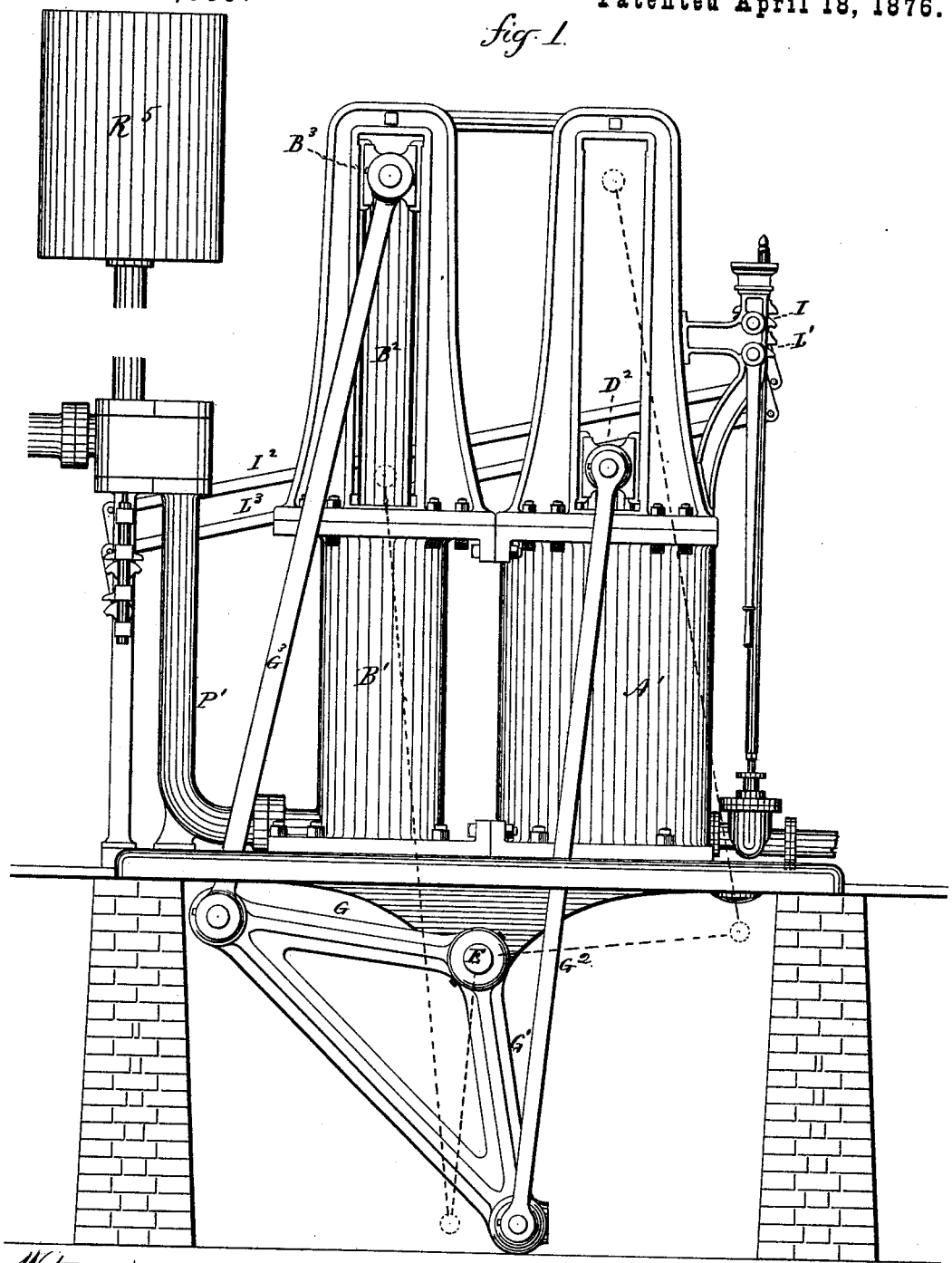

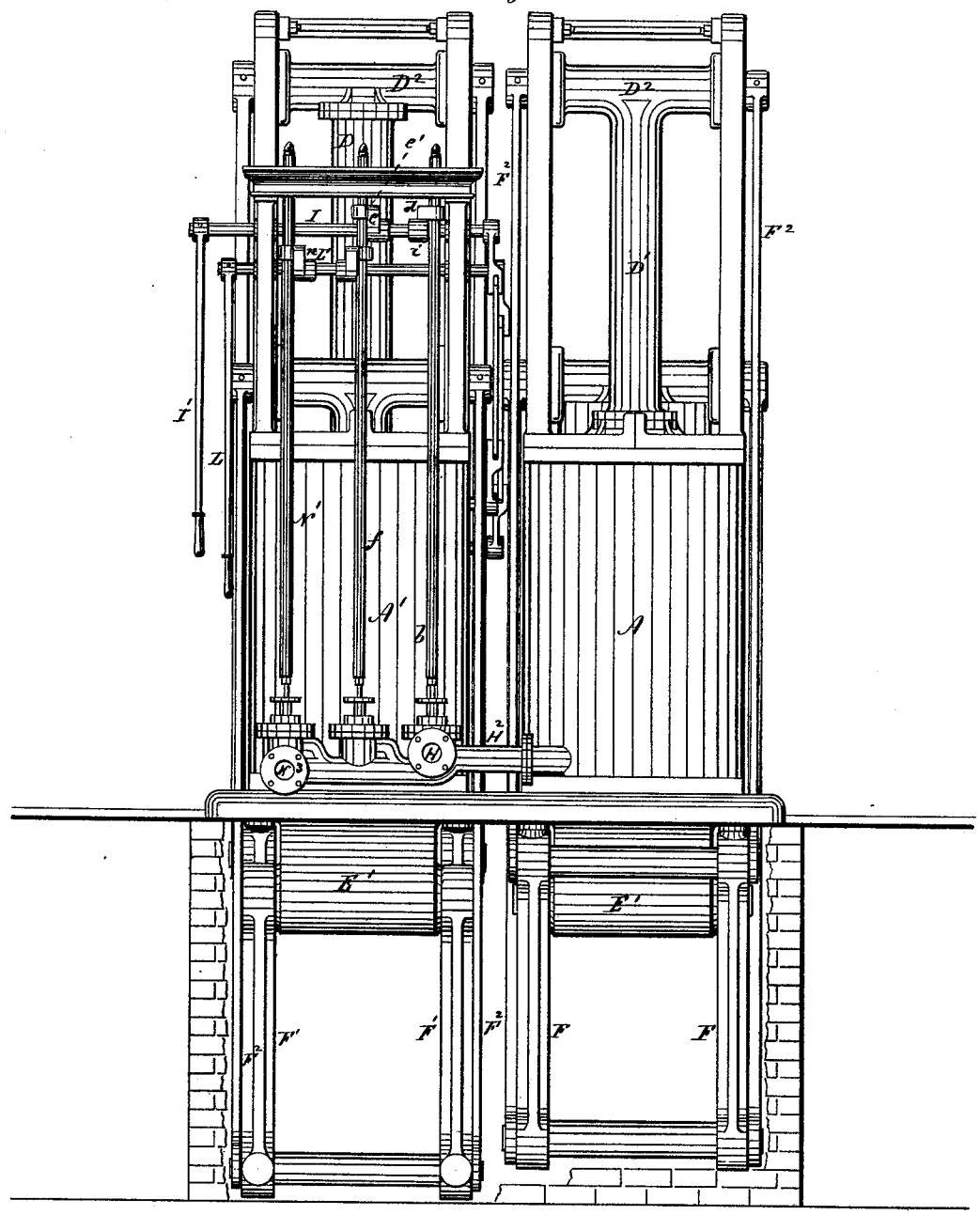

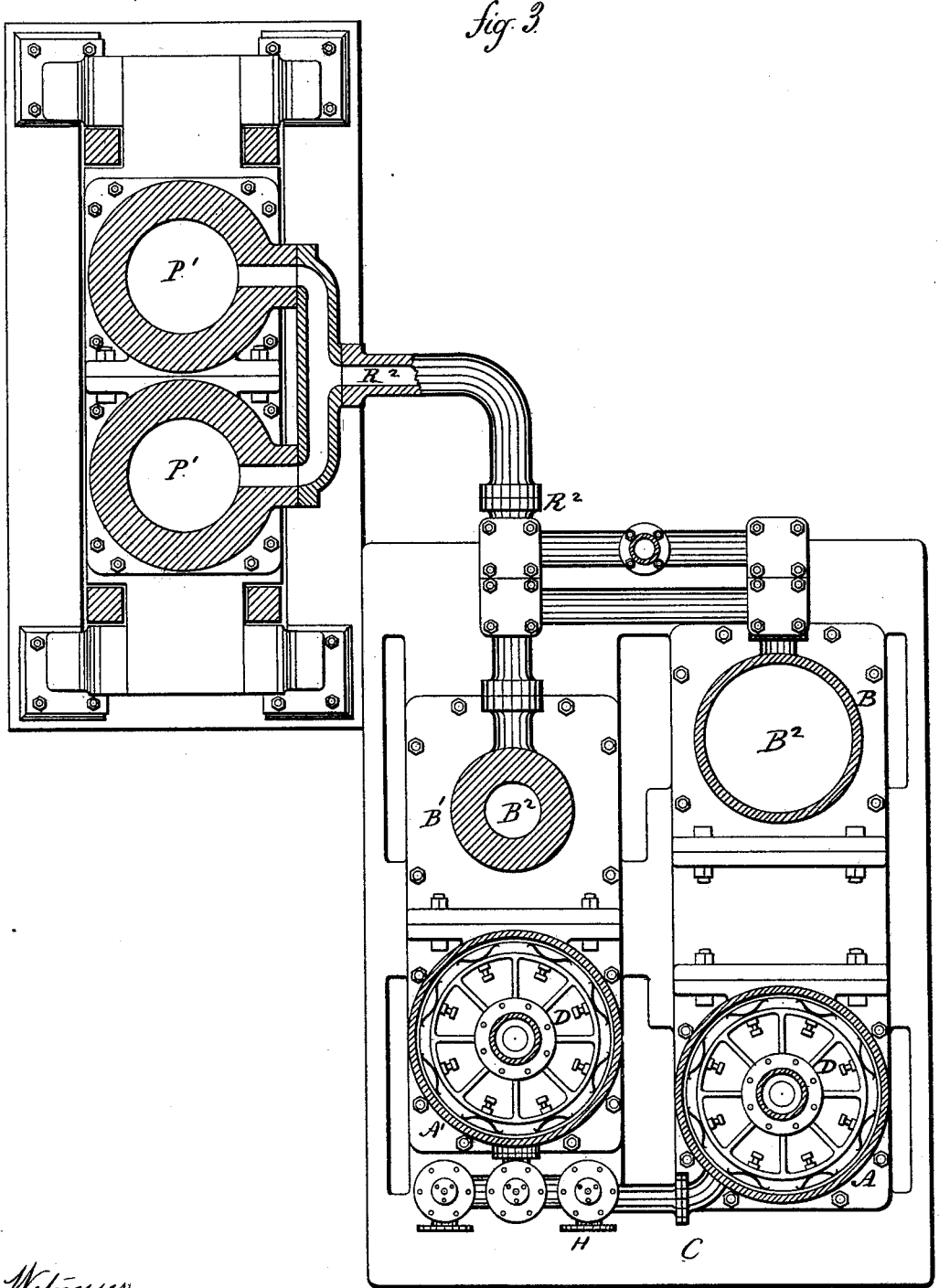

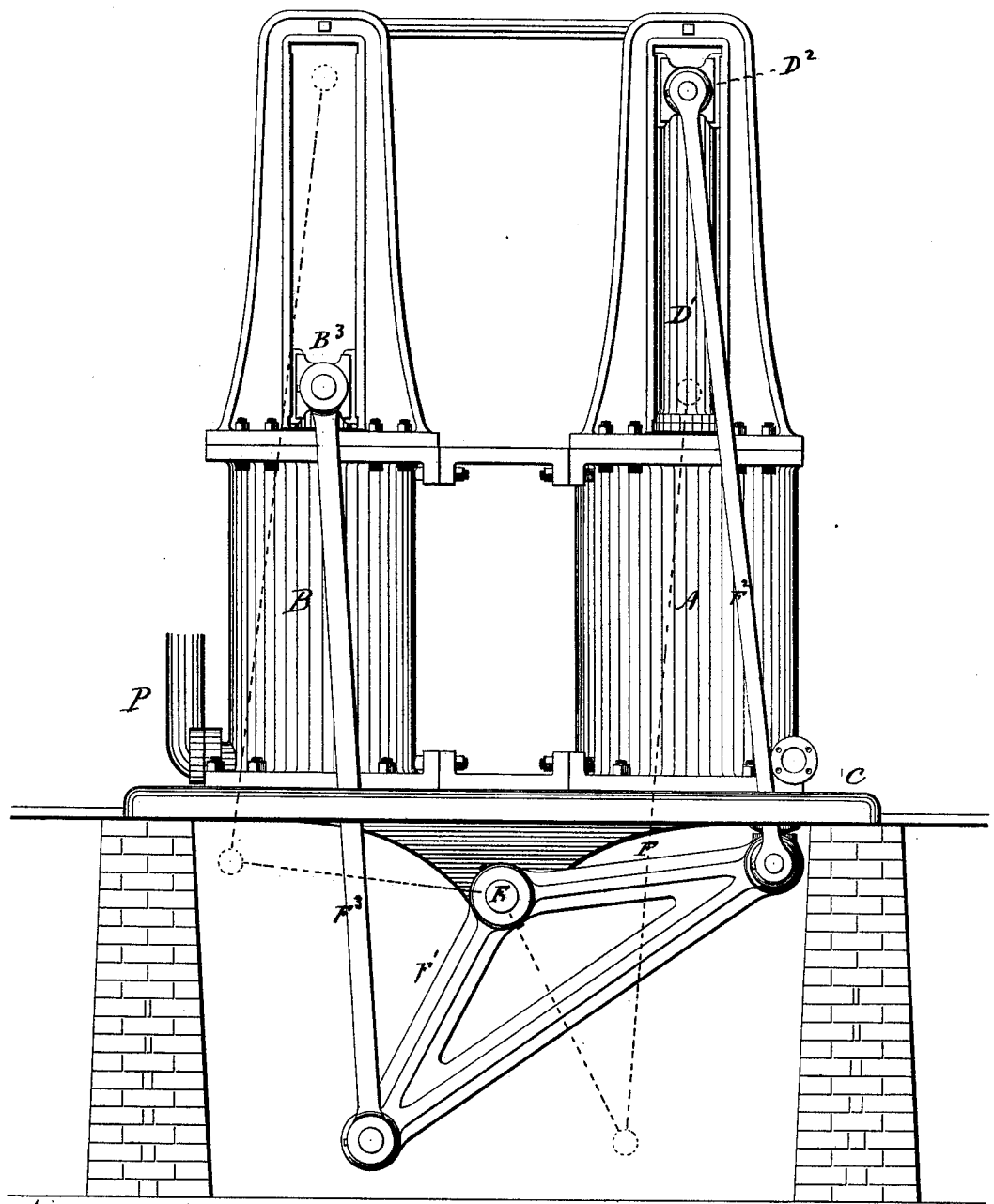

UNITED STATES PATENT OFFICE.

PHILOS B. TYLER, OF NEW HAVEN, CONNECTICUT.

IMPROVEMENT IN HYDRAULIC COTTON-PRESSES.

Specification forming part of Letters Patent No. 176,385, dated April 18, 1876; application filed May 4, 1875.

*To all whom it may concern:*

Be it known that I, PHILOS B. TYLER, of New Haven, in the county of New Haven and State of Connecticut, have invented a new Improvement in Cotton-Press; and I do hereby declare the following, when taken in connection with the accompanying drawings and the letters of reference marked thereon, to be a full, clear, and exact description of the same, and which said drawings constitute part of this specification, and represent, in—

Figure 1, front view; Fig. 2, right-hand side view; Fig. 3, sectional plan view; Fig. 4, front of the two rear cylinders, the two front cylinders, Fig. 1, removed; Figs. 5, 6, 7, 8, 9, and 10, details of construction, illustrating the valve arrangement.

This invention relates to an improvement in the means for operating presses for compressing cotton, and like purposes.

Since the introduction of my progressive-lever cotton-press, for which Letters Patent were granted to me in 1845, reissued, No. 92, in 1847, it has been the aim of inventors of presses for compressing cotton to obtain an accelerating power to meet the increasing resistance of the bale as it diminishes in size under compression.

A number of progressive-lever presses have been devised, but in all such presses the power increases in a specific ratio, and the ultimate power is obtained only at a given point, while bales of cotton for compression vary in size, and offer a varying resistance under compression, according to their weight and shape, and the point to which they are compressed varies also in the same proportion; hence, as the press can only give its full pressure at a fixed point, and the varying bales of cotton require widely different points of pressure, shifting platens are required, consuming time in adjustment, as well as being complicated in construction.

In the ordinary hydraulic press the power for compression is the same at all points of the movement of the platen, but inventions were devised to commence the pressure with a number of pumps, and by throwing off portions of them at different points of compression, as the resistance increased, give a partial progressive power to the press. Others have been used with pistons of varying diameter, using the larger pistons at the beginning, and the smaller ones in completing the pressure, by which a similar progressive power was obtained. Others brought to bear additional hydraulic cylinders at different points of pressure, acted upon by the same pumps, thereby causing an increasing power as the resistance increased. Thus while numerous devices have been resorted to for rendering the hydraulic press progressive in its power, none have as yet produced a regular progressive force, increasing in the ratio of the increasing resistance of the bale of cotton under compression, but have succeeded only in approximating to it by stopping off pumps at given points, or putting into action at different points pumps of diminished capacity, or of adding hydraulic cylinders of increased power at certain definite points.

The object of my invention is to give to any ordinary hydraulic press a progressive power which may be increased in the proportion of the increasing resistance of the bales of cotton or other substances under compression, and to be able to vary the increasing power at any point of its action, so as to adapt its progressive force to meet the resistance of the various sizes of bales of cotton; and it consists in combining with the hydraulic press one or more pumping-engines, operated by progressive or bent levers, so arranged that the constant action of a steam-piston shall increase the pressure upon the pump, which, when acting upon the piston of the hydraulic cylinder, shall give that an increasing power in the proportion desired; or, so that when steam is acting upon the steam-piston expansively, and diminishing in pressure, said progressive levers shall increase in a proportion to give the decreasing pressure on the steam-piston an increasing force upon the pump, which, in connection with the hydraulic-press piston, gives the desired increasing power to meet the increasing resistance of the bale of cotton, or other substance; also, in means for varying their action upon bales of different weights and sizes.

A and A' are two steam-cylinders, preferably of equal diameter, arranged in a vertical position upon a base, C. B and B¹ are pump-cylinders, vertically arranged upon the same base, but of differing diameters. The steam-cylinders are each provided with a piston, D, attached to a piston-rod, D¹, and to independent cross-heads D², properly guided, and in substantially the usual manner for steam-pistons and cross-heads. The pumps are provided, respectively, with pistons B² attached to properly-guided cross-heads B³, in substantially the usual manner for power-pumps. the cylinder A serving as the means for driving the pump B and the cylinder A' for driving the pump B¹. Beneath the cylinders A and B is hung a progressive or bent lever, consisting of two arms, F F¹, hung upon a suitable bearing, E, upon which the lever freely oscillates. The two arms are arranged upon an obtuse angle from the bearing and relatively to each other, as hereinafter described. There is a pair of these levers, one at each side, as seen in Fig. 2, but the two working together as one. From the outer ends of the arms F a connecting-rod extends up each side, and is jointed to the cross-head D² of the steam piston. The other arm, F¹, of the lever is connected by connecting rods F³ to the cross-heads B³ of the pump B. The angle of the arms F F¹, or their relative position to each other and to the pistons, is such that when the steam-piston is down, and the lever standing in the position denoted in broken lines, the relation of the arm F to the arm F¹ is as of 1 to 2 in leverage—that is to say, the arm F¹, standing horizontal, carries the connecting-rod twice as far from the fulcrum as the arm F, standing at the incline, does its connecting-rod from the same fulcrum, as clearly seen in Fig. 4. In this position steam is admitted beneath the piston, (the pump being filled with water,) causing the piston to rise, and gradually turning the lever until the relative position is reversed, as denoted in Fig. 4. Hence, supposing the initial pressure over the whole surface of the steam-piston to be one hundred and twenty thousand pounds, that exerted upon the pump will be sixty thousand pounds, the pressure of steam continuing the same throughout the stroke, the progressive movement of the levers reversing their action. The final pressure on the pump will, therefore, be four times the original, or two hundred and forty thousand pounds—twice that of the steam-cylinder—this result having been obtained by regular progressive increase and the water forced from the pump through the pipe P to the cylinders E' of the press, imparting to the press this regular progressive pressure, and, as the area of this pump, as here represented, is equal to that of the press-pistons, the same pressure of two hundred and forty thousand pounds is thereby given to the press.

The steam in the first cylinder A, having exerted its force upon its pump, is now permitted by a valve arrangement, as hereinafter described, to pass to the second steam-cylinder A', the piston in that cylinder being down, as indicated in Fig. 1.

Beneath the cylinders A' B¹ upon a bearing, E, levers are arranged similar to those described as under the first cylinders, save that, by preference, the angle between the two arms G and G¹ is less obtuse than that of the first. The arm G¹ is connected by rods G² to the cross-head of the steam-cylinder, and the other arm, G, by rods G³, to the cross-head of the pump-cylinder. The angle between the two arms G and G¹ is such that when the arm G¹ is down, and the other, G, up, the leverage, relatively to the fulcrum, is as four of the arms G to one of G¹, but when reversed, as denoted in broken lines, the relative leverage is as five of G¹ to one of G.

Steam having been cut off from the first cylinder, and communication opened between the said first cylinder and the second cylinder A', the steam passes into this second cylinder beneath the piston, there to work expansively, the initial pressure for this cylinder being substantially that of the first, (one hundred and twenty thousand pounds,) and, as the leverage is as four to one, the pressure is, consequently, thirty thousand pounds on the pump-piston, and this piston, as here represented, is one-eighth of the area of the press-pistons; hence, the initial pressure exerted by the pump B¹ in the press is two hundred and forty thousand pounds—that is, this pump commences its action at the same power at which the pump B left it. The piston of the steam-cylinder is forced up by the expansive force of the steam until it arrives at its other extreme, where the pressure upon it is reduced to, say, fifty-four thousand pounds, making due allowance for natural loss by expansion, the leverage being at that point as five to one. The consequent pressure upon the pump-piston is five times the amount of that on the steam-piston, or two hundred and seventy thousand pounds, and this, multiplied by the relative proportion of the pump-piston to the press-pistons, (eight to one) gives the pressure of two million one hundred and sixty thousand pounds to the press-platen. These figures and proportions are given only as illustrations, it being understood that the proportions of the pistons and the angle of the levers may be changed without departing from the principles of this invention.

The descent of the piston in the pump forces the water to the press through a valve arrangement hereinafter described. The steam-valve arrangement is illustrated in Fig. 5; also, seen in Fig. 2.

Steam is admitted, through an opening, H, into a chamber, H¹, above a valve, a, from which a spindle, b, rises, its upper end supported in a suitable guide, and on the spindle is a shoe, d, and beneath this a rock-shaft, I, on which is a cam, i, the rock-shaft actuated by a hand-lever, I¹, so that, by turning the said lever in one direction—say, to the right—to bring the action of the cam upon the shoe, the spindle b will be raised, and with it the valve a. The raising of this valve permits the steam to flow through the passage $H^2$ to the cylinder A. The valve is held open until the piston is raised to its full height, in order to preserve in this cylinder the full or initial force of the steam. So soon as the piston in the cylinder A is thus raised the valve $a$ is closed by returning the hand-lever to its vertical position. At the same time another cam, $e$, upon the opposite side of the rock-shaft, acts, by a movement of the hand-lever to the left, upon an arm, $e'$, on a vertical rod, $f$, to raise a valve, $h$, as denoted in Fig. 5. This permits the steam from the cylinder A to return, through the passage $H^2$, down through the open valve $h$, through a passage, $H^3$, to the second cylinder $A'$, there to exert its expansive force, as before described.

Having exerted that force, and fully raised the piston of the cylinder $A'$, and thus brought the platen of the press to its maximum pressure, the exhaust-valve N is raised by a cam, $n$, on the shaft $L^1$, actuated by moving the hand-lever L, say, to the right, to raise the valve-rod $N^1$, opening the exhaust-passage $N^3$ so that steam will escape from the cylinder $A'$.

In order to exhaust the first cylinder A, the lever L, and rock-shaft $L^1$ are turned in the opposite direction, or to the left, which brings cams to bear on both rods $f$ and $N^1$, and opens the two valves $h$ and N, thus allowing the steam which may have remained in the first cylinder to escape through the open valve $h$ and exhaust-valve N, through the passage $N^3$, or, if desired to exhaust both cylinders at the same time, this last movement of the hand-lever L should be first made.

As the bales are of varying bulk, it follows that the platen of the press must be raised to different heights for different bales, according to such variation.

If the same quantity of water be acted upon by the pumps at each operation the platen must be raised to a certain point, and as the maximum pressure can only be attained when the pistons of the pumps have attained their extreme forcing movement, it follows that the quantity of water forced beneath the platen must vary according to the variation in the elevation of the platen. It is, therefore, necessary to provide for such escape or removal of surplus water, and this is accomplished through the valve arrangement shown in Figs. 6, 7, 8, 9, and 10.

The pipe P from the first cylinder leads the water up through the valve $t$ to the passage R, thence across and up through the valve $r$ to the passage $R^1$, and thence through the opening $R^2$ to the cylinder of the press. The valves $t$ and $r$ opening toward the press close automatically. So soon as the piston in the pump B ceases its movement, then the water from the other pump $B^1$ passes through the pipe $P'$, through the valve $r$ into the passage $R^1$, and thence through the same passage $R^2$ to the cylinders of the press, the valve $t$ acting as a check to keep the pressure from the first cylinder.

Supposing the pump-cylinders full of water to be just the amount required to raise the press-platen to the extreme of its movement; but if, at any time before this point is reached, the resistance is found to be greater than the force being exerted, or such as to retard too much the movement of the platen, a sufficient quantity of water is permitted to escape from before the pump-piston, to allow the leverage to increase sufficiently to overcome the resistance. To provide for such escape the valve $R^3$ is raised, opening from the passage $R^1$, to allow a portion of the water to flow through into an escape-passage, $R^4$; thence to a reservoir, $R^5$, Fig. 1.

Such a provision may be necessary for both cylinders in order to allow the full throw of the pistons. To do this an arm is attached to each of the rock-shafts I and $L^1$, and from these respectively, rods $I^2$ and $L^3$ extend across to levers $I^3$ and $L^4$, on similar rock-shafts $I^4$ and $L^5$, each actuating a cam, $I^5$ and $L^6$, to work upon arms $I^6$ and $L^7$, on a vertical spindle, $R^5$, which is attached to the valve $R^3$.

Whenever, therefore, in the working of either of the cylinders the operator finds that the pump-pistons come to a bearing before they have completed their full pressure, he turns the lever—which he is holding in his hand for the purpose of holding the steam-valve open—a little farther, and so as to raise the valve $R^3$ and permit a portion of the water to escape to the reservoir. So soon as this relief is afforded the pump will continue to move until it has attained its full pressure and the entire advantage of the progressive levers.

In order that the escape of water may not be too rapid I arrange an auxiliary valve, $m$, in the valve $R^3$, of comparatively small area, which will be opened by the raising of the spindle $R^5$ before the power of the spindle will reach the principal valve; and this auxiliary valve may be alone opened for the escape of water, to increase the pump leverage, but the continued movement of the spindle $R^5$ will open the principal valve, all of which is governed by the hand-lever, whenever it becomes necessary to hasten the motion of the platen, by augmenting the leverage of the pump. This operation applies to both pumps, the same valve $R^3$ being operated by both of the steam-valve levers. Thus the maximum pressure of the press may be obtained at any point within the range of the platen.

While the bale is being secured the exhaust-valve is opened by turning the lever L to the right to allow the steam to escape from the cylinder $A'$, and the water to flow from the reservoir through the check-valve S to the pump $B^1$, and raise that piston, then turning the lever L to the left to open the two valves, N and $h$, the steam will escape from the cylinder A, and water will in like manner flow into and fill the pump-cylinder B and raise the piston.

In case both cylinders are exhausted at the same time, as before described, both pump-cylinders will be filled accordingly and ready for another operation.

The connection from the rock-shaft $L^1$ to the other rock-shaft $L^5$ opens the valve $R^3$ and permits the water beneath the platen to return directly to the reservoir.

It will be understood that the reservoir must be elevated above the pump-pistons in order that the natural fall of the water will raise the pump-pistons, or an equivalent means provided for drawing the water back, or fresh water to the pumps.

The check-valve S allows the water to flow freely from the reservoir to the pumps, but prevents the flow from the pumps under pressure to the reservoir.

In order to prevent wear in the ends of the connecting-rods the cross-heads are made tubular, and a shaft passed through them, to which the ends of the rods are rigidly secured.

I have represented the pistons as working downward, the progressive levers arranged beneath, but it will be readily understood that this arrangement may be reversed with the same result.

Having thus fully described my invention, what I claim, and desire to secure by Letters Patent, is—

1. In combination with a hydraulic press, one or more steam pumping-engines or pumps, the steam-pistons of which are combined with the force-pumps, through the intervention of progressive levers, substantially as described, whereby the action of such pump or pumps upon the platen or follower of the press shall give a force increasing in the ratio of the increasing resistance, or nearly so.

2. The combination of the piston of a steam-cylinder with the piston of a pump, through the intervention of progressive levers.

PHILOS B. TYLER.

Witnesses:
JOHN E. EARLE,
CLARA BROUGHTON.